Patented Jan. 7, 1941

2,227,618

UNITED STATES PATENT OFFICE 2,227,618

RESINOUS CONDENSATION PRODUCT

Werner Zerweck and Max Schubert, Frankfort-on-the-Main-Fechenheim, Germany, assignors to I. G. Farbenindustrie Aktiengesellschaft, Frankfort-on-the-Main, Germany No Drawing. Application March 21, 1939, Serial No. 263,184. In Germany March 22, 1938

5 Claims. (Cl. 260—51).

Our present invention relates to resinous condensation products, more particularly to those obtained by condensing aldehydes, particularly formaldehyde, or substances liberating aldehydes with compounds of the general formula:

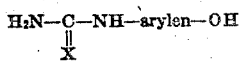

wherein arylen means a radical of the benzene and naphthalene series and X stands for a member of the group consisting of O and S. The condensation reaction may be carried out in a neutral, acid or alkaline medium, in liquors or melts of an organic or inorganic nature, in solution or suspension, in the cold or in the hot.

Besides the above compounds other substances which can be condensed with aldehydes, such as urea, thiourea, substituted ureas, dicyandiamide, sulfonamides, carboxylic acid amides, amines, phenols, aminodi- and aminotriazines and the like may be added to the reaction mixtures. The resins formed may moreover be used in admixture with natural and other artificial resins, such as phenol, urea, aniline, aminotriazine, alkyd or ketonic resins.

According to the condensation conditions, particularly to the quantity and the nature of the additional components the properties of the resins may be varied to a far-reaching degree.

In order to further illustrate our invention the following examples are given the parts being by weight and all temperatures in degrees centigrade.

Example 1

10 parts by weight of 2-hydroxyphenyl-urea of the formula:

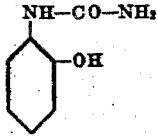

are mixed with about 100 parts by weight of an aqueous formaldehyde solution of 30% strength and 2 parts of pyridine and the mixture is heated on the water bath until dry. Then the residue is heated at 90 to 100° for some hours. In this manner a yellowish resin is obtained which is insoluble in organic solvents.

Example 2

10 parts of 4-hydroxyphenylurea of the formula:

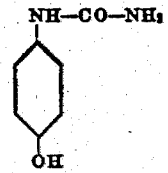

are mixed with about 100 parts of an aqueous formaldehyde solution of 30% strength and the mixture is slowly evaporated to dryness to about 90 to 100°. The residue is maintained at this temperature for some hours. The reaction product is a resin soluble in aqueous caustic soda solution and insoluble in organic solvents. A very similar resin is obtained when replacing the 4-hydroxyphenylurea by the same amount of 4-hydroxyphenylthiourea.

Example 3

5 parts of 3-hydroxyphenylurea of the formula:

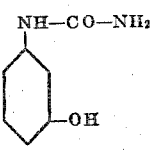

are dissolved while warming in a mixture of about 25 parts of alcohol and 10 parts of a formaldehyde solution of 30% strength. After addition of 0.2 part of hexamethylene-tetramine the reaction mass is evaporated to dryness and the formed resin is hardened by shortly heating at 130 to 140°.

When replacing the formaldehyde solution by 4 parts of benzaldehyde a similar resin of a good resistance to water is obtained.

Example 4

A mixture of 10 parts of 3-hydroxyphenylthiourea of the formula:

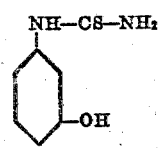

about 100 parts of an aqueous formaldehyde solution of 30% strength and 1 part of pyridine is evaporated to dryness on the water bath. The residue is heated for some hours at 90 to 100°. A resin, insoluble in organic solvents, is obtained.

Example 5

10 parts of 4-hydroxynaphthylurea of the formula:

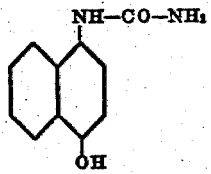

(crystallizing from water as colorless leaflets of 188° melting point and obtainable by decomposing in an aqueous solution 1-4-aminonaphthol-hydrochloride with potassium cyanate) are dissolved by warming in about 50 parts of alcohol and 30 parts of formaldehyde solution of 40% strength. The dark solution is then evaporated to dryness on the waterbath and the residue is heated for a longer time at 90 to 100°. The reaction product is a dark, lustrous and water repelling resin.

We claim:

1. Resinous condensation products obtained by condensing an aldehyde with a compound of the general formula:

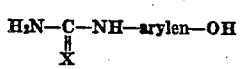

wherein arylene means a radicle of the benzene and naphthalene series and X stands for a member of the group consisting of O and S.

2. Resinous condensation products obtained by condensing formaldehyde with a compound of the general formula:

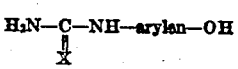

wherein arylene means a radicle of the benzene and naphthalene series and X stands for a member of the group consisting of O and S.

3. A resinous condensation product obtained by condensing formaldehyde with 2-hydroxyphenyl-urea of the formula:

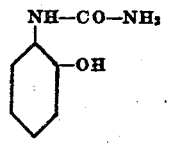

which resin is insoluble in organic solvents.

4. A resinous condensation product obtained by condensing formaldehyde with 3-hydroxyphenyl-urea of the formula:

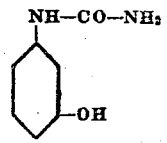

which resin is insoluble in organic solvents.

5. A resinous condensation product obtained by condensing formaldehyde with 3-hydroxyphenylthiourea of the formula:

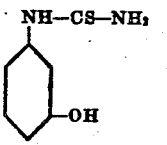

which resin is insoluble in organic solvents.

WERNER ZERWECK.
MAX SCHUBERT.